United States Patent Office 3,301,828
Patented Jan. 31, 1967

---

3,301,828
CONDENSATION PRODUCTS OF AROMATIC DIESTERS AND 1,4,5,8-TETRAAMINO-NAPHTHALENE AND POLYMERS THEREOF
Carl S. Marvel, Tucson, Ariz., assignor to E. I. du Pont de Nemours and Company, Wilmington, Del., a corporation of Delaware
No Drawing. Filed Jan. 27, 1964, Ser. No. 340,502
22 Claims. (Cl. 260—78.4)

This invention relates to new and useful polymeric products, and to a method of preparing the same, and more particularly to condensation polymers formed by the condensation of 1,4,5,8-tetraamino naphthalene and certain diesters of aromatic compounds.

It has been discovered that, when 1,4,5,8-tetraamino naphthalene is heated to a temperature in the range between 125° C. and 200° C. with a diester of an aromatic dicarboxylic acid for a time sufficient to permit reaction, there is formed an imido ester condensation polymer having repeating units predominately of the Formula I:

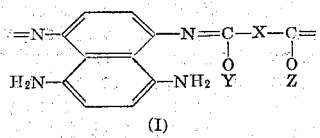

(I)

wherein X is a divalent aromatic radical and Y and Z are alkyl, aryl or aralkyl hydrocarbon radicals having up to ten carbon atoms. The polymeric imido ester can be fabricated to useful articles, in some instances by melt fabrication techniques, such as injection molding, compression molding or extrusion, and in other instances by coalescing under pressure at elevated temperatures.

If the condensation reaction is performed at higher temperatures, generally from about 250° C. to 350° C., or, if the imido ester condensation product I is heated to a temperature in the range between 250° C. and 350° C., cyclization occurs to produce polymeric products containing 2:7 disubstituted 1:8 dihydro 1,3,6,8-tetraazopyrene rings, i.e., compounds having repeat units predominately of the Formula II:

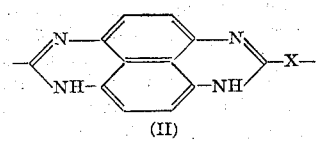

(II)

wherein X has the same significance as in Formula I.

If the condensation reaction is performed in the presence of air or other oxidant, or the products having repeat units predominately of the Formula I or II are heated in air or other oxidizing gas, the 2:7 disubstituted 1:8 dihydro 1,3,6,8-tetraazopyrene rings are oxidized to 2:7 disubstituted 1,3,6,8-tetraazopyrene rings to form polymers with repeat units predominatly as shown by the Formula III:

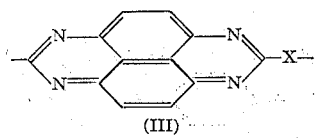

(III)

The imido ester condensation polymers having predominately repeating units I are soluble in dimethyl acetamide and dimethyl sulfoxide and have an inherent viscosity in the latter solvent generally in the range between 0.1 and 0.8. The polymers containing the condensed ring systems of II and III are generally insoluble in the common organic solvents but are sparingly soluble in concentrated sulfuric acid and are found to have an inherent viscosity in that solvent of about 0.1 to 0.8. From the inherent viscosity data, it can be estimated that the molecular weight is at least 10,000. It can be calculated from this molecular weight, i.e., by assuming that both ends of the molecule are terminated by ester groups, that the maximum ester oxygen content due to end groups in the ideal cyclized products having repeat units represented by the Formulae II and III would be 0.64%. In practice, it has not been found possible to reduce the ester oxygen content below about 2%, as determined by elemental analysis, indicating that the intramolecular cyclization reaction of the polymer having repeat units of the Formula I, to give polymers having repeat units II or III, is generally incomplete. It has been found that the solubility and thermal resistance of the polymeric products is greatly increased when the degree of cyclization upon heating is sufficient to reduce the ester oxygen content of the product below about 8% and that, when the ester oxygen content of the product is below about 6%, the products which consist predominately of polymers having repeat units represented by the Formulae II or III are substantially insoluble in all common organic solvents.

The reasons for the incomplete cyclization reaction of the product having repeat units represented by Formula I are not completely understood. It will be evident to those skilled in the art that 1,4,5,8-tetraamino naphthalene may conceivably react with aromatic dicarboxylic diesters to form linear condensation products through the 1:5 or the 1:8 amino groupings in addition to the 1:4 groupings. In the case of 1:5 condensation, the product may be cyclized and oxidized to yield a product identical with that obtained by polycondensation with the 1:4 amino groups. On the other hand, it is probable that products formed by condensation through the 1:8 amino groups cannot be cyclized readily. It is believed, nevertheless, from studies with model compounds and from physical test data, such as infrared spectrograms, that the principal condensation reaction takes place with the 1:4 amino groups to give a product having predominately repeat units indicated by the Formula I. The incomplete cyclization of the repeat units represented by Formula I upon heating may possibly be due to the formation of isomeric condensation products as hereinabove noted, or possibly due to impurities in the 1,4,5,8-tetraamino naphthalene, which is conveniently formed in situ by reduction of 1,4,5,8-tetranitro naphthalene as discussed hereinbelow. It is also possible that the incomplete cyclization of the repeat units I is due to the lack of mobility of the polymeric chains in the solid state.

With regard to the aromatic biradical X, this should preferably contain one or two aromatic rings which may be substituted with lower alkyl groups having from one to ten carbon atoms. Representative bivalent aromatic radicals are ortho, meta or paraphenylene which may be represented collectively by the formula:

1:2-naphthylene, 1:3-naphthylene, 1:4-naphthylene, 1:5-naphthylene, 1:6-naphthylene, 1:7-naphthylene, 1:8-naphthylene, represented collectively by the formula:

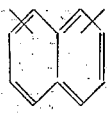

2,2-biphenylene, 2,3-biphenylene, 2,4-biphenylene, 3,3-biphenylene, 3,4-biphenylene, 4,4-biphenylene, represented collectively by the formula:

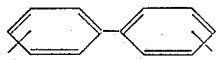

and radicals of the type represented collectively by the formula:

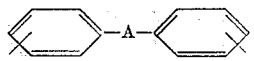

wherein A is a bivalent radical, such as —O—, —CH$_2$—, —C(CH$_3$)$_2$—, —C(CF$_3$)$_2$—, —S—, —Si(OCH$_3$)$_2$— and the like. It is also contemplated that the aromatic nuclei may be substituted with halogen, lower alkyl or alkoxy groups having from one to ten and preferably from one to four carbon atoms.

The diester compounds corresponding to these biradicals which are employed as the starting materials may be simple or mixed esters of alcohols, phenols or aralkyl monohydroxy compounds of which the phenols and particularly phenol, C$_6$H$_5$OH, is preferred, i.e., in the Formula I, Y and Z are hydrocarbon radicals, such as alkyl, aralkyl or aryl radicals having up to ten carbon atoms.

The initial condensation reaction can be performed by heating the ingredients together in an inert atmosphere either alone or in the presence of an inert liquid which need not, however, be a solvent. 1,4,5,8-tetraamino naphthalene, however, is a sensitive and unstable material and it is generally preferable to use as a starting material 1,4,5,8-tetranitro naphthalene which is then reduced with a noble metal catalyst, such as finely divided platinum or palladium on charcoal and hydrogen in the reaction vessel. The 1,4,5,8-tetraamino naphthalene is preferably prepared by reduction of the corresponding tetranitro naphthalene prior to the addition of the aromatic diester ingredient. It is however, also possible to prepare imido ester condensation polymers of this invention by reduction of 1,4,5,8-tetranitro naphthalene after addition of the aromatic dicarboxylic diester ingredient and at reaction temperature so that the 1,4,5,8-tetraamino naphthalene is produced and condensed to form the polymer having repeat units predominately of the Formula I as it is made.

It is generally desirable to isolate the intermediate imido ester polymers prior to cyclization and accordingly the condensation reaction should be conducted at a temperature below the temperature of which cyclization occurs, i.e., from about 125° C. to about 200° C. and preferably at temperatures below 150° C. The phenyl esters of the dibasic aromatic acids are generally more reactive than the aliphatic esters and for that reason are preferred since they enable the condensation reaction to occur at the lowest possible temperature.

The final tetraazopyrene polymers having repeat units predominately of the Formula III are intractable materials which do not melt below 400° C. and which exhibit a high degree of thermal stability. They are particularly useful as high temperature insulating materials. The intermediate imido ester condensation polymers having repeat units predominately of the Formula I are considerably more tractable materials. In particular, the imido ester condensation polymers containing two phenyl radicals united by a divalent bridge grouping may generally be fabricated by melt operations, such as extrusion or injection molding. Other imido ester polymers may be fabricated by coalescing the powder under heat and pressure, generally a pressure in the range between 1,000 and 10,000 p.s.i. and a temperature in the range between 200° C. and 300° C. is suitable for this coalescing operation. It is generally preferable to fabricate the materials while in the intermediate imido ester state and thereafter convert this material to the intractable tetraazopyrene polymers by heating, if necessary, in the mold and by treatment with oxygen, air or other oxidizing gas. Many other modifications in this invention will be apparent to those skilled in the art; for example, mixtures of the aromatic discarboxylic diesters may be condensed with tetraamino naphthalene and thereafter cyclized and oxidized according to the process of this invention.

The invention will be better understood by the following specific examples which are intended by way of illustration and should not be construed as limiting the scope of this invention. In these examples all parts are by weight unless otherwise stated.

*Example I*

In a pressure flask is placed 6.16 parts of 1,4,5,8-tetranitro naphthalene and 1 part of palladium catalyst on charcoal in 300 parts by volume of diethyleneglycol dimethyl ether which is then shaken with 6.32 parts of diphenyl isophthalate under 50 lbs. p.s.i. pressure of hydrogen at a temperature of 130° C. for 65 hours. The diethyleneglycol dimethyl ether is then removed by distillation and the residue is dissolved in dimethyl acetamide and filtered to remove the reduction catalyst. The filtrate is then precipitated by the addition of the mixture of alcohol in water and washed several times with methanol and diethyl ether and dried at 0.1 mm. of mercury to a constant weight. The product is then fractionated by treatment with further quantities of diethyleneglycol dimethyl ether followed by filtration and precipitation. There is isolated (1) a fraction soluble in diethylene glycol dimethyl ether (71% yield; inherent viscosity in dimethyl acetamide of 0.15; anal. C, 65.38%; H, 4.83%; N, 11.68%; O, 13.53%) and (2) a fraction insoluble in diethyleneglycol dimethyl ether but soluble in dimethyl acetamide (11% yield; inherent viscosity in dimethyl acetamide 0.28; anal. C, 59.09%; H, 4.26%; N, 16.40%). The infrared spectrum was consistent with repeat units having the formula:

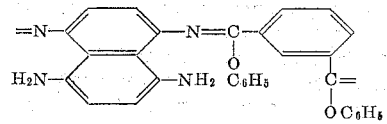

*Example II*

The procedure of Example I is repeated, except that the reduction is carried out to 130° C. for 28 hours and thereafter the reaction mixture is heated under reduced pressure at 280° C. for 3 hours. There is obtained a 60% yield of polymer soluble in dimethyl sulfoxide (inherent viscosity in dimethyl sulfoxide 0.47; anal. C, 71.66%; H, 3.25%; N, 16.40%) and a 21% yield of a material insoluble in dimethyl sulfoxide or dimethyl acetamide but which is soluble in concentrated (96%) sulfuric acid. The infrared spectrum of the soluble product was substantially identical with the infrared spectrum of the products formed in Example I. The infrared spectrum of the material insoluble in dimethyl sulfoxide or dimethyl acetamide but soluble in concentrated sulfuric acid was consistent with the polymer having repeat units of the formula:

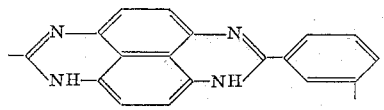

which has been partially oxidized to repeat units of the formula:

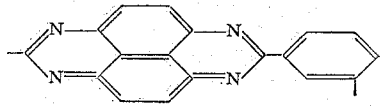

Example III

The procedure of Example I is repeated at the same reduction temperature for a time of 50 hours. After removing the diethyleneglycol dimethyl ether by distillation at reduced pressure, the reaction produced is heated under nitrogen at 350° C. for 5 hours. There is obtained 32% of a polymer soluble in dimethyl sulfoxide (inherent viscosity in that solvent 0.70; anal. C, 73.20%; H, 4.07%; N, 15.33%; O, 8.78%) and 48% of an insoluble polymer (anal. C, 73.26%; H, 3.84%; N, 18.00%; O, 7.57%). The product soluble in dimethyl sulfoxide had an infrared spectrum substantially identical to that of the product obtained in Example I. The insoluble product had an infrared spectrum which showed the presence of metasubstituted benzene rings and tetraazopyrene rings, together with some dihydrotetraazopyrene rings.

Example IV

A suspension of 12.32 parts of 1,4,5,8-tetranitro naphthalene and 2 parts palladium catalyst on charcoal in 200 parts of diethyleneglycol dimethyl ether is shaken with hydrogen under a pressure of 50 lbs. p.s.i. at 50° C. for 46 hours. The reaction mixture is then filtered under an inert atmosphere and the filtrate is added to a solution of 12.64 parts of diphenyl isophthalate in 100 parts of diethyleneglycol dimethyl ether. This solution is then heated at 180° C. under nitrogen for 3 hours and the diethyleneglycol dimethyl ether is then removed by distillation. The product is found to be soluble in dimethyl acetamide and dimethyl sulfoxide. This material can be molded to form a black sheet by pressing in a heated press at a temperature of 300° C. and a pressure of 3,000 p.s.i. for a time of 30 minutes. After seasoning for 100 hours in air at 300° C., the articles are form stable at a temperature of 400° C. Thermogravimetric analysis of a portion of the air-treated material at a heating rate of 6° C. per minute in nitrogen indicates that no substantial weight loss occurs below 400° C. In air less than 1% weight loss is found to occur on heating at 6° C. per minute with a flow rate of 700 mils per minute of air, from room temperature up to 340° C. The infrared spectrum of the soluble material shows absorption bands of 3450 and 3300 cm.$^{-1}$ indicating the presence of primary $NH_2$ groups in the polymeric material and is otherwise consistent with an imido ester condensation polymer having the repeat units shown in Example I. The infrared spectrum of the material after the oxygen treatment is substantially the same as that of an authentic sample of 2,7 diphenyl 1,3,6,8-tetraazopyrene, the principal difference being that characteristic infrared frequencies associated with meta-disubstituted benzene are present in the spectrum. When a portion of the soluble material is heated at 300° C. under reduced pressure for 2 hours, there is obtained 12% of a polymer soluble in dimethyl sulfoxide (inherent viscosity 0.52 in that solvent; inherent viscosity in concentrated sulfuric acid 0.05; anal. C, 73.00%; H, 3.84%; N, 16.71%; O, 5.40%; and 60% of a polymer insoluble in dimethyl sulfoxide but sparingly soluble in concentrated sulfuric acid having an inherent viscocity in that solvent of 0.66; anal. C, 75.22%; H, 3.10%; N, 18.63%; O, 2.40%).

Example V 6.16 parts of 1,4,5,8-tetranitro naphthalene and 1 part of palladium catalyst on charcoal in 400 parts of diethyleneglycol dimethyl ether are shaken with 6.32 parts of diphenyl terephthalate at 60° C. for 48 hours under 50 lbs. p.s.i. under hydrogen pressure. The diethyleneglycol dimethyl ether is then distilled off under nitrogen and the residue heated at 200° C. for 1 hour under reduced pressure. The product contains 73% of a polymer soluble in dimethyl sulfoxide. Infrared examination shows the presence of amine groups and ester groups and is consistent with a polymeric structure compound of repeat units having the formula:

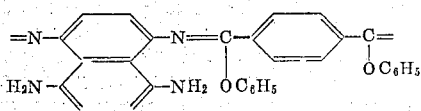

This product can be fabricated into sheets by pressing under 5,000 p.s.i. pressure at a temperature of 300° C. for about half an hour.

Example VI

A suspension at 12.32 parts of 1,4,5,8-tetranitro naphthalene and 2 parts of palladium catalyst on charcoal in 300 parts of diethyleneglycol dimethyl ether is shaken at 50° C. for 40 hours with hydrogen under a pressure of 50 lbs. p.s.i. The reaction mixture is then filtered under an inert atmosphere and the filtrate added to a solution of 12.64 parts of diphenyl terephthalate in 100 parts of diethyleneglycol dimethyl ether and heated at 170° C. under nitrogen for 3 hours. The diethyleneglycol dimethyl ether is then distilled off under reduced pressure. This product can be molded under pressure in heat in the manner similar to that of the product formed in Example V and has a substantially identical infrared spectrum. The product is then heated to 300° C. under reduced pressure for 2 hours and fractionated by treatment with dimethyl sulfoxide. 31% of the product was soluble in that solvent and had an inherent viscosity of 0.46; anal. C, 72.63%; H, 3.96%; N, 11.12%; O, 9.72%; and 62% of the polymer was insoluble in dimethyl sulfoxide but soluble in concentrated sulfuric acid. (Inherent viscosity in concentrated sulfuric acid was 0.60; anal. C, 75.33%; H, 3.94%; N, 18.20%; O, 2.55%.) The insoluble product had an infrared spectrum consistent with a polymer having predominantly repeating units of the formula:

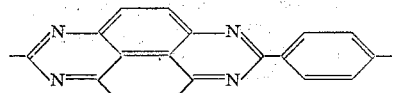

Example VII

A solution of 14.32 parts of diphenyl 2,6-naphthalene dicarboxylate in 200 parts of diethyleneglycol dimethyl ether is added to a solution of the reduction product of 12.32 parts of 1,4,5,8-tetranitro naphthalene in 400 parts of diethyleneglycol dimethyl ether. The mixture is heated at 250° C. under nitrogen for 3 hours and the solvent is removed by distillation. This product can be molded under pressure of 5,000 p.s.i. under temperature of 250° C. and has an infrared spectrum consistent with the structure:

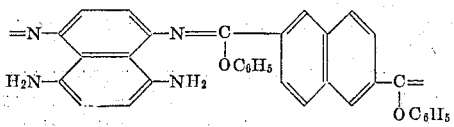

The solid product is then heated to 300° C. under reduced pressure for 2 hours to give a yield of 73% of an insoluble black polymer (anal. C, 77.04%; H, 4.63%; N, 15.56%) and having an infrared spectrum consistent with repeat units of the structure:

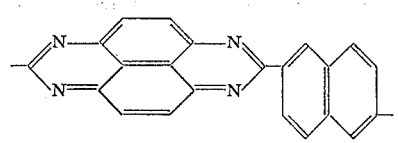

Example VIII

A solution of 8.2 parts of diphenyl oxy-bis-benzoate in 100 parts of diethyleneglycol dimethyl ether is added to a solution of the reduction product of 6.16 parts of 1,4,5,8-tetranitro naphthalene in 250 parts of diethyleneglycol dimethyl ether. The mixture is heated at 250° C. under nitrogen for 3 hours and the solvent is distilled off. The product is a polymer having a melting point of about 186° C. which can be melt fabricated, having a polymeric structure composed of repeat units with the formula:

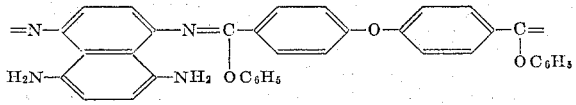

This product is heated at 300° C. under reduced pressure for 2 hours, is then extracted with dimethyl sulfoxide. A 50% yield of a polymer not melting below 350° C. and insoluble in the usual solvents but slightly soluble in concentrated sulfuric acid is obtained. The inherent viscosity of this polymer in concentrated sulfuric acid is 0.34; anal. C, 76.14%; H, 4.26%; N, 11.98%; O, 6.77%. A 13% yield of the polymer in 186° C. and easily soluble in dimethyl sulfoxide was also obtained. Inherent viscosity in that solvent is 0.13; anal. C, 73.42%; H, 4.75%; N, 10.08%; O, 9.24%. The infrared spectrum of the insoluble material was consistent with a polymeric structure having predominately repeat units of the formula:

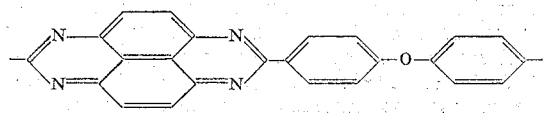

I claim:
1. A solid composition of matter comprising a polymeric structure having predominately repeat units represented by the formula:

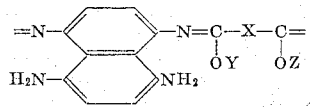

wherein X is a bivalent aromatic organic radical having from 1 to 2 aromatic rings and Y and Z are hydrocarbon radicals having up to 10 carbon atoms and having predominately ester end groups.
2. Composition of claim 1 in which Y and Z are phenyl.
3. Composition of claim 2 having a molecular weight of at least 10,000.
4. Composition of claim 3 in which X is the metaphenylene radical.
5. Composition of claim 3 in which X is the paraphenylene radical.
6. Composition of claim 3 in which X is the 1:5-naphthylene radical.
7. Composition of claim 3 in which X is the 4,4'-oxy-biphenylene radical.
8. A process for the manufacture of polymeric materials which comprises mixing 1,4,5,8-tetraamino naphthalene with an aromatic dicarboxylic phenyl ester of the formula

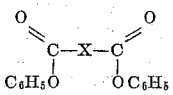

wherein X is a bivalent aromatic organic radical having from 1 to 2 aromatic rings, the substituents of said aromatic organic radical being selected from the class consisting of hydrogen, halogen, alkyl or alkoxy of 1–4 carbon atoms and heating the mixture to a temperature in the range between 125° C. and 200° C. for a time sufficient to effect reaction and recovering from the product an imido ester condensation polymer.
9. Process of claim 8 in which the aromatic dicarboxylic phenyl ester is diphenyl isophthalate.
10. Process of claim 8 in which the aromatic dicarboxylic phenyl ester is diphenyl terephthalate.
11. Process of claim 8 in which the aromatic dicarboxylic phenyl ester is diphenyl 2:6 dinaphthalene dicarboxylate.
12. Process of claim 8 in which the dicarboxylic phenyl aromatic ester is diphenyl 4,4'-oxy-bis-benzoate.
13. Process of claim 8 which additionally comprises the step of heating the imido ester condensation product to a temperature in the range between 250° C. and 350° C. in air for a time sufficient to reduce the ester oxygen content below about 8%.
14. Process of claim 9 which additionally comprises the step of heating the imido ester condensation product to a temperature in the range between 250° C. and 350° C. in air for a time sufficient to reduce the ester oxygen content below about 8%.
15. Process of claim 10 which additionally comprises the step of heating the imido ester condensation product to a temperature in the range between 250° C. and 350° C. in air for a time sufficient to reduce the ester oxygen content below about 8%.
16. Process of claim 11 which additionally comprises the step of heating the imido ester condensation product to a temperature in the range between 250° C. and 350° C. in air for a time sufficient to reduce the ester oxygen content below about 8%.
17. A solid composition of matter comprising a polymeric substance having predominately repeat units of the chemical formula:

wherein X is a bivalent organic radical having from 1 to 2 aromatic rings and having predominately ester end groups.
18. Composition of claim 17 wherein X is the metaphenylene radical.
19. Composition of claim 17 wherein X is the paraphenylene radical.
20. Composition of claim 17 wherein X is the 2:6-naphthylene radical.
21. Composition of claim 17 wherein X is the 4,4'-oxy-biphenylene radical.
22. Composition of claim 17 having a molecular weight of at least 10,000.

References Cited by the Examiner
UNITED STATES PATENTS
2,895,948    7/1959    Brinker et al. _____ 260—78

JOSEPH L. SCHOFER, *Primary Examiner.*

L. WOLF, L. G. CHILDERS, *Assistant Examiners.*